United States Patent
Dilley et al.

(10) Patent No.: US 12,500,930 B2
(45) Date of Patent: Dec. 16, 2025

(54) STATELESS TRANSMISSION CONTROL PROTOCOL CONNECTIONS

(71) Applicant: AT&T Intellectual Property I, L.P., Atlanta, GA (US)

(72) Inventors: Ronald Alan Dilley, Simi Valley, CA (US); Thomas Liston, McHenry, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 313 days.

(21) Appl. No.: 18/299,712

(22) Filed: Apr. 12, 2023

(65) Prior Publication Data
US 2024/0348648 A1    Oct. 17, 2024

(51) Int. Cl.
| | |
|---|---|
| H04L 9/40 | (2022.01) |
| H04L 47/34 | (2022.01) |
| H04L 47/35 | (2022.01) |
| H04L 69/16 | (2022.01) |

(52) U.S. Cl.
CPC .......... *H04L 63/1491* (2013.01); *H04L 47/34* (2013.01); *H04L 47/35* (2013.01); *H04L 63/1425* (2013.01); *H04L 63/1466* (2013.01); *H04L 63/166* (2013.01); *H04L 69/16* (2013.01)

(58) Field of Classification Search
CPC ............... H04L 63/1491; H04L 63/166; H04L 63/1425; H04L 63/1466; H04L 47/34–35
See application file for complete search history.

(56) References Cited

U.S. PATENT DOCUMENTS

| | | | |
|---|---|---|---|
| 7,502,860 B1* | 3/2009 | Champagne | H04L 47/34 709/227 |
| 10,270,705 B1* | 4/2019 | Adelman | H04L 47/34 |
| 11,595,423 B2 | 2/2023 | Hodgman et al. | |
| 2015/0047032 A1* | 2/2015 | Hannis | H04L 63/1491 726/23 |
| 2023/0198912 A1* | 6/2023 | Mcdonnell | H04L 63/1466 370/230 |

OTHER PUBLICATIONS

Khawaja, Areeb, "Enhancing Cybersecurity with Low-Interaction Honeypots: A Strategic Approach to Threat Intelligence," Linkedin, Jun. 8, 2023, https://www.linkedin.com/pulse/enhancing-cybersecurity-low-interaction-honeypots-approach-khawaja/.

\* cited by examiner

*Primary Examiner* — Nam T Tran

(57) ABSTRACT

A method includes receiving a first message from a client device requesting an establishment of a transmission control protocol connection, wherein the first message contains a first sequence number for the transmission control protocol connection, calculating, based on the first sequence number and a first integer from a list of a plurality of randomly generated integers, a second sequence number for the transmission control protocol connection, sending a second message to the client device in response to the first message, wherein the second message contains the second sequence number, receiving a fourth message containing an acknowledgement number, extracting a second integer from the acknowledgement number, determining whether the fourth message originated with the client device by comparing the second integer to the first integer, and sending a fifth message to the client device, wherein a type of the fifth message is selected based on an outcome of the determining.

20 Claims, 4 Drawing Sheets

STATELESS TRANSMISSION CONTROL PROTOCOL CONNECTIONS

The present disclosure relates generally to network security, and relates more particularly to devices, non-transitory computer-readable media, and methods for providing stateless transmission control protocol connections that can be implemented in low-interaction honeypots, as well as other applications.

BACKGROUND

Honeypots are computer security mechanisms that detect, block, and/or counteract attempted intrusions in computer networks. Typically, a honeypot is disguised as some high-value network assets (e.g., a server, a database, or the like) that would be considered attractive to potential attackers. However, when an attacker attempts to engage with the honeypot, the honeypot is able to collect information about the attacker that can be used to better understand the mechanisms of the attack and to strengthen the network's resistance and resilience to similar attacks. Honeypots can also be used as decoys to lure potential attackers away from actual high-value assets in the network.

SUMMARY

In one example, the present disclosure describes a device, computer-readable medium, and method for providing stateless transmission control protocol connections that can be implemented in low-interaction honeypots. For instance, in one example, a method performed by a processing system including at least one processor includes receiving a first message from a client device requesting an establishment of a transmission control protocol connection, wherein the first message contains a first sequence number for the transmission control protocol connection, calculating, based on the first sequence number and a first integer from a list of a plurality of randomly generated integers, a second sequence number for the transmission control protocol connection, sending a second message to the client device in response to the first message, wherein the second message contains the second sequence number, receiving a fourth message containing an acknowledgement number and data, extracting a second integer from the acknowledgement number, determining whether the fourth message originated with the client device by comparing the second integer to the first integer, and sending a fifth message to the client device, wherein a type of the fifth message is selected based on an outcome of the determining.

In another example, a non-transitory computer-readable medium stores instructions which, when executed by a processing system including at least one processor, cause the processing system to perform operations. The operations include receiving a first message from a client device requesting an establishment of a transmission control protocol connection, wherein the first message contains a first sequence number for the transmission control protocol connection, calculating, based on the first sequence number and a first integer from a list of a plurality of randomly generated integers, a second sequence number for the transmission control protocol connection, sending a second message to the client device in response to the first message, wherein the second message contains the second sequence number, receiving a fourth message containing an acknowledgement number and data, extracting a second integer from the acknowledgement number, determining whether the fourth message originated with the client device by comparing the second integer to the first integer, and sending a fifth message to the client device, wherein a type of the fifth message is selected based on an outcome of the determining.

In another example, a system includes a processing system including at least one processor and a non-transitory computer-readable medium storing instructions which, when executed by the processing system, cause the processing system to perform operations. The operations include receiving a first message from a client device requesting an establishment of a transmission control protocol connection, wherein the first message contains a first sequence number for the transmission control protocol connection, calculating, based on the first sequence number and a first integer from a list of a plurality of randomly generated integers, a second sequence number for the transmission control protocol connection, sending a second message to the client device in response to the first message, wherein the second message contains the second sequence number, receiving a fourth message containing an acknowledgement number and data, extracting a second integer from the acknowledgement number, determining whether the fourth message originated with the client device by comparing the second integer to the first integer, and sending a fifth message to the client device, wherein a type of the fifth message is selected based on an outcome of the determining.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
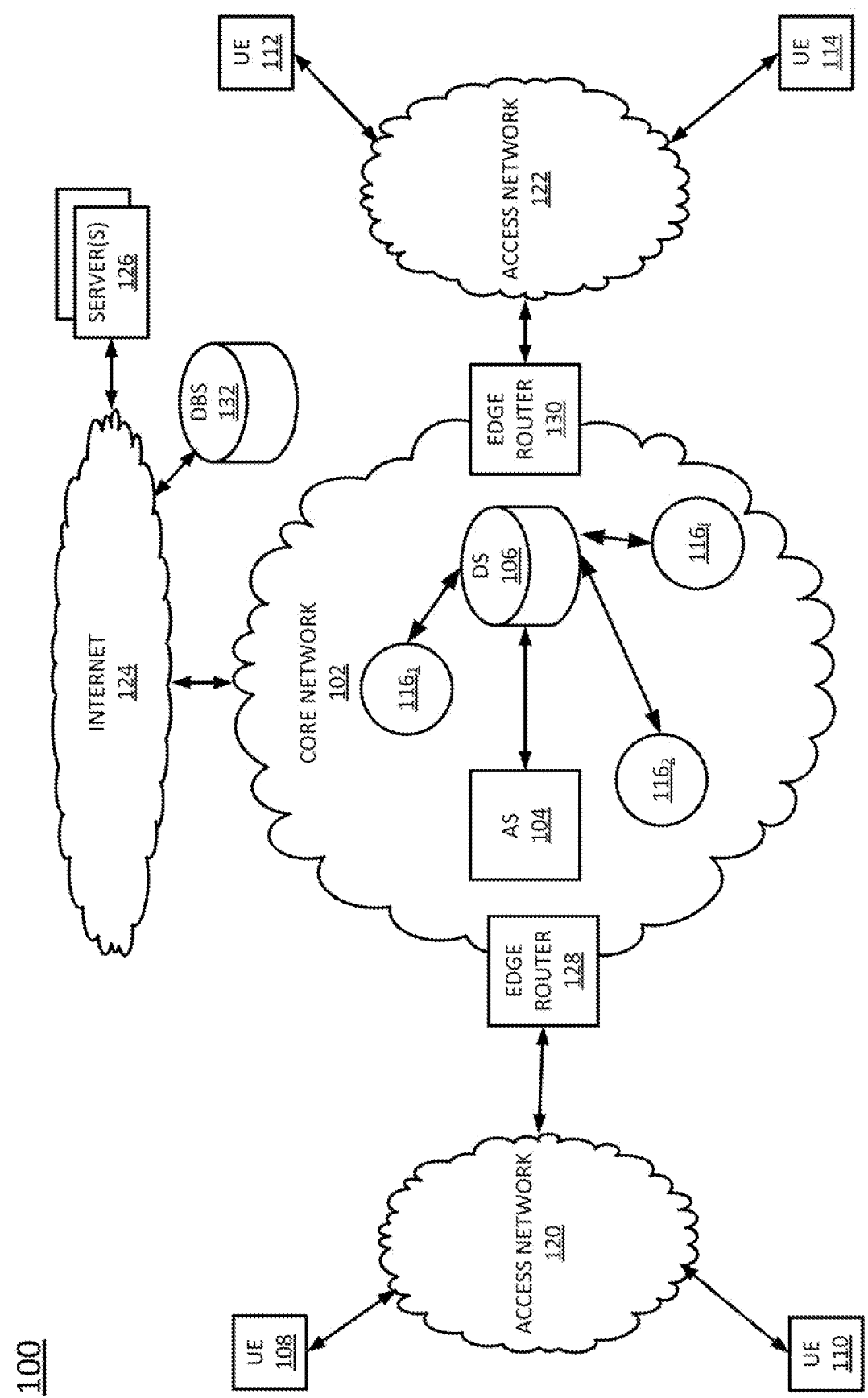
FIG. 1 illustrates an example system in which examples of the present disclosure for providing stateless transmission control protocol connections that can be implemented in low-interaction honeypots may operate.

In one example, the present disclosure provides a system, method, and non-transitory computer readable medium for providing stateless transmission control protocol connections that can be implemented in low-interaction honeypots and other applications. As discussed above, honeypots are computer security mechanisms that detect, block, and/or counteract attempted intrusions in computer networks. Typically, a honeypot is disguised as some high-value network assets (e.g., a server, a database, or the like) that would be considered attractive to potential attackers. However, when an attacker attempts to engage with the honeypot, the honeypot is able to collect information about the attacker that can be used to better understand the mechanisms of the attack and strengthen the network's resistance and resilience to similar attacks. Honeypots can also be used as decoys to lure potential attackers away from actual high-value assets in the network.

So-called "low-interaction" honeypots capture and log connection attempts, but tend not to allow attackers to gain access to the network. For instance, a low-interaction honeypot may listen for suspicious Internet Protocol (IP) traffic on a set of ports that is known to be a common target for would-be intruders (e.g., ports and/or services associated with particular services or operating systems). Although low-interaction honeypots are typically simple to deploy, existing low-interaction honeypots are designed to monitor only a limited number of the more than 65,000 possible ports. This is because, for each standard TCP connection, a server's operating system must allocate a significant amount of memory to storing information about the connecting system (client). Moreover, the server must maintain a list of all active TCP connections and their current states (e.g., LISTEN, SYN_RECEIVED, ESTABLISHED, CLOSED_WAIT, LAST_ACK, CLOSED), which adds significantly to the system overhead and therefore limits the number of TCP connections that the server can simultaneously support. System resources, in the form of an in-memory structure known as a "socket," also must be pre-allocated for each listening port, which limits the number of ports on which the system can simultaneously listen. As such, low-interaction honeypots tend to be used to collect data about attack paths that are already well known.

Examples of the present disclosure provide stateless TCP connections that can be used to implement a low-interaction honeypot that is capable of monitoring network traffic on all ports (more than 65,000) associated with an IP address without allocating sockets. In one example, the low-interaction honeypot tracks the states of all ongoing TCP connections within the session values of the TCP messages exchanged between the server(s) and the client, rather than requiring the server(s) to track and store the states of the TCP connections. This, in turn, allows the server(s) to perform session establishment and to respond appropriately for thousands of TCP connections simultaneously.

In one example, attacks may be monitored by the disclosed low-interaction honeypot at full line speed while conserving processing and memory resources, making the low-interaction honeypot ideal for deployment even in network environments that experience high volumes of network traffic. The low-interaction honeypot can be implemented in any network, without prior knowledge or understanding of the network's topology, traffic patterns, or attack surfaces. The low-interaction honeypot can also report on all external interactions. In other words, the disclosed low-interaction honeypot sees and responds to activity on all ports and services, as opposed to a limited set of known ports and services.

In further examples, the stateless TCP connections disclosed herein may have utility beyond honeypots and other deception-based security systems. For instance, a web server could utilize the stateless TCP approach disclosed herein to provide high-performance hypertext transfer protocol (HTTP) while offering resilience against malicious attacks that target the state-machine on which all other TCP services rely inside the network stack. In another example, a web proxy may expose a stateless TCP web service to untrusted networks while providing common stateful TCP sockets on the back of the web proxy. These and other aspects of the present disclosure are discussed in further detail with reference to FIGS. 1-4, below.

To further aid in understanding the present disclosure, FIG. 1 illustrates an example system 100 in which examples of the present disclosure for providing stateless transmission control protocol connections that can be implemented in low-interaction honeypots may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a next-gen network, e.g., 6G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, at least one data store (DS) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a wearable device (e.g., a smart watch or fitness tracker), an augmented reality (AR), virtual reality (VR) headset, customer premises equipment (e.g., gateway devices), a bank or cluster of such devices, and the like. In one example, any one of the user endpoint devices 108, 110, 112, and 114 may be operable to run an application that may communicate with the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. Thus, some of the servers 126 and DBs 132 may host applications including video conferencing applications, extended reality (e.g., virtual reality, augmented reality, mixed reality, and the like) applications, immersive gaming applications, streaming video or audio applications, and the like.

In accordance with the present disclosure, the AS 104 may be configured to provide one or more operations or functions in connection with examples of the present disclosure for providing stateless transmission control protocol connections that can be implemented in low-interaction honeypots, as described herein. The AS 104 may comprise one or more physical devices, e.g., one or more computing systems or servers, such as computing system 400 depicted in FIG. 4, and may be configured as described below. In another example, the AS 104 may host a plurality of (e.g., one thousand or more) stateless, low-interaction honeypots using virtualization technologies. In another example, the stateless, low-interaction honeypots may comprise hardware sensors $116_1$-$116_i$ (hereinafter individually referred to as a "sensor 116" or collectively referred to as "sensors 116"). The sensors 116 may comprise single-board computers with Ethernet ports and/or cellular modems connected to the core network 102.

Figure 4:
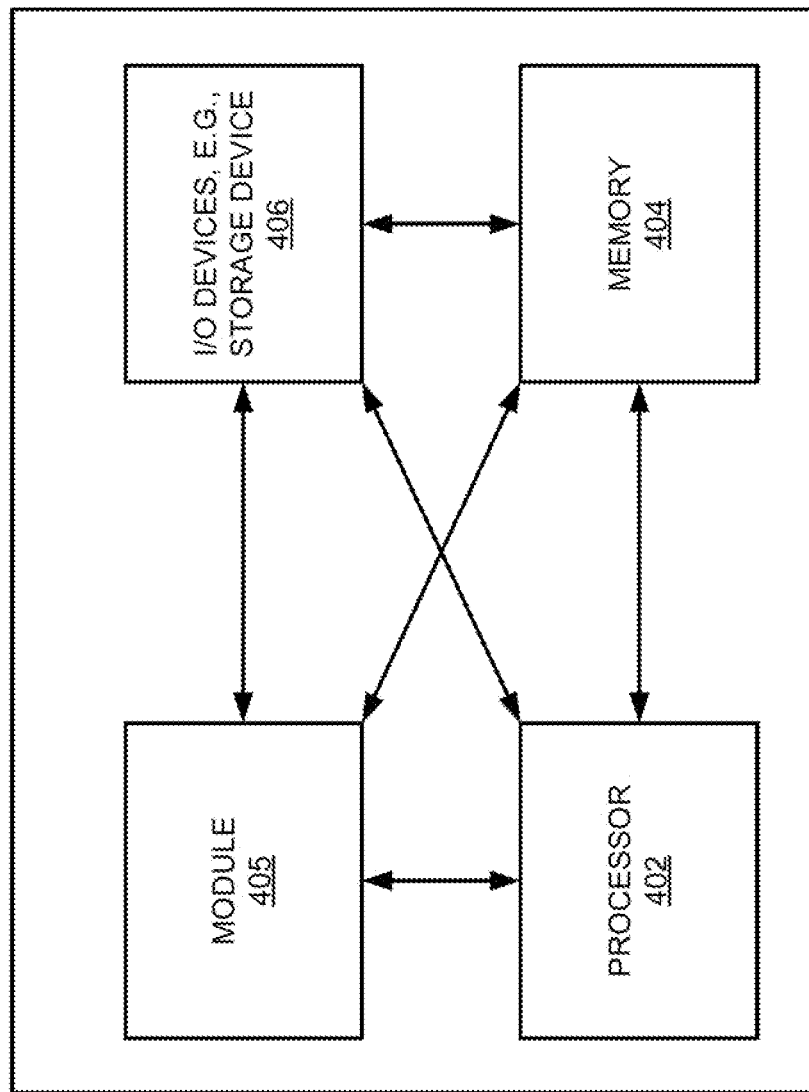
FIG. 4 depicts a high-level block diagram of a computing device specifically programmed to perform the functions described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the DS 106 may store a plurality of ordered lists of randomly generated integers. In one example, the randomly generated integers may be generated by the AS 104. In one example, the AS 104 may be configured to select a "mask width," m (where in one example, m has a value in the range of 2-32), and to generate $2^m$ random thirty-two bit integers (e.g., 256 integers for m=8) that are stored in the DS 106. The m least significant bits of each integer of the $2^m$ random integers are replaced with a unique value (e.g., unique among the $2^m$ random integers). The random integers may further be stored in an ordered manner in the DS 106 using these values in the m least significant bits. For instance, the random integers may be sorted in the DS 106 in either ascending or descending order according to the m least significant bits. As discussed in further detail below, the AS 104 may access these random integers for the generation of a sequence numbers for a TCP connection and to track the state of the TCP connection over time. Additionally, a chosen number, k (where k may have a value in the range of 2-10), of random thirty-two bit integers may be generated to be used as a list of "overmask" values (e.g., overmask(0) through overmask(k−1). As discussed in further detail below, the AS 104 may access these overmask values for use in the generation of a sequence number for a TCP connection and to track the state of a TCP connection over time.

In one example, the DS 106 may include a physical storage device integrated with the AS 104 (e.g., a database server or a file server), or attached or coupled to the AS 104, in accordance with the present disclosure. In one example, the DS 106 may comprise in-memory storage coupled to the AS 104. In one example, the AS 104 may load instructions into a memory, or one or more distributed memory units, and execute the instructions for providing stateless transmission control protocol connections that can be implemented in low-interaction honeypots, as described herein.

In one example, any of the user endpoint devices 108, 110, 112, or 114 (or any applications running thereon) may initiate a TCP connection with one or more servers, such as AS 104 or servers 126. In this case, the TCP connection may be established for the transfer of data, such as streaming video data, streaming audio data, video gaming data, virtual conferencing data, extended reality data, or other application data. To establish the TCP connection, the UE 108, 110, 112, or 114 may perform what is known in the art as a "three-way handshake" with the AS 104. The three-way handshake involves, among other things, the exchange of sequence numbers and acknowledgement numbers by the UE 108, 110, 112, or 114 and the AS 104. A sequence number (seq) is the byte number of the first byte of data in a TCP packet that is sent. An acknowledgement number (ack) is the sequence number of the next byte that the receiver of the packet expects to receive. The receiver acknowledging receipt of sequence number j acknowledges receipt of all data bytes less than (but not including) byte number j.

In one example, the sequence number provided by the AS 104 is calculated based on: (1) the IP address of the UE 108, 110, 112, or 114; (2) the source port of UE 108, 110, 112, or 114 from which a packet was sent; (3) the destination port of the AS 104 at which the packet was received; and (4) a randomly generated integer (e.g., a first unused randomly generated integer in the unordered list stored in the DS 106). When the UE 108, 110, 112, or 114 responds to a message received from the AS 104, the UE 108, 110, 112, or 114 will provide an acknowledgement number that is the sequence number augmented by one. An integer can be derived by the AS 104 from the acknowledgement number and compared to the randomly generated integer that was used to calculate the sequence number. If the derived integer matches the randomly generated integer, then the AS 104 can confirm that it has communicated with the UE 108, 110, 112, or 114 (i.e., that the UE from which the acknowledgement number was received is not an unknown UE).

Thus, the sequence number calculated by the AS 104 allows the AS 104 to track the state of TCP connections without having to store the state information locally. Instead, the state information is effectively stored in the messages exchanged between the AS 104 and the UE 108, 110, 112, or 114. This significantly reduces the amount of overhead required to track the states of TCP connections and allows the AS 104 to efficiently track the states of TCP connections on all ports, as opposed to tracking the states of the TCP connections on a limited number of known ports. By employing this method of tracking state in a low-interaction honeypot, activity on all ports associated with an IP address can be efficiently and effectively monitored, ensuring that all attack activities are seen, even on ports that are not known to be common targets of attacks.

An example method for providing stateless transmission control protocol connections that can be implemented in low-interaction honeypots is discussed in further detail below in connection with FIGS. 2 and 3. In one example, the disclosed method only monitors traffic between the honeypot and the Internet but does not monitor personal traffic. All interactions on all ports associated with an IP address may be logged and forwarded to a server. For each observed interaction, the log may specify one or more of: the time of the interaction, an identifier of the honeypot that observed the interaction, packet and/or protocol lengths, source IP address, destination IP address, source fully qualified domain name, source domain, source autonomous system number, source autonomous system number organization, source reputation score (e.g., based on blacklist membership), and packet payload details (e.g., source port, destination port, acknowledgement number, sequence number, flags, etc.).

In further examples, the low-interaction honeypot may take remedial action against a source of an attack, such as by blocking any incoming packets from the source, blocking high volume or high-risk inbound connections, blocking inbound connections from IP addresses with reputation scores that are below a threshold, or the like.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
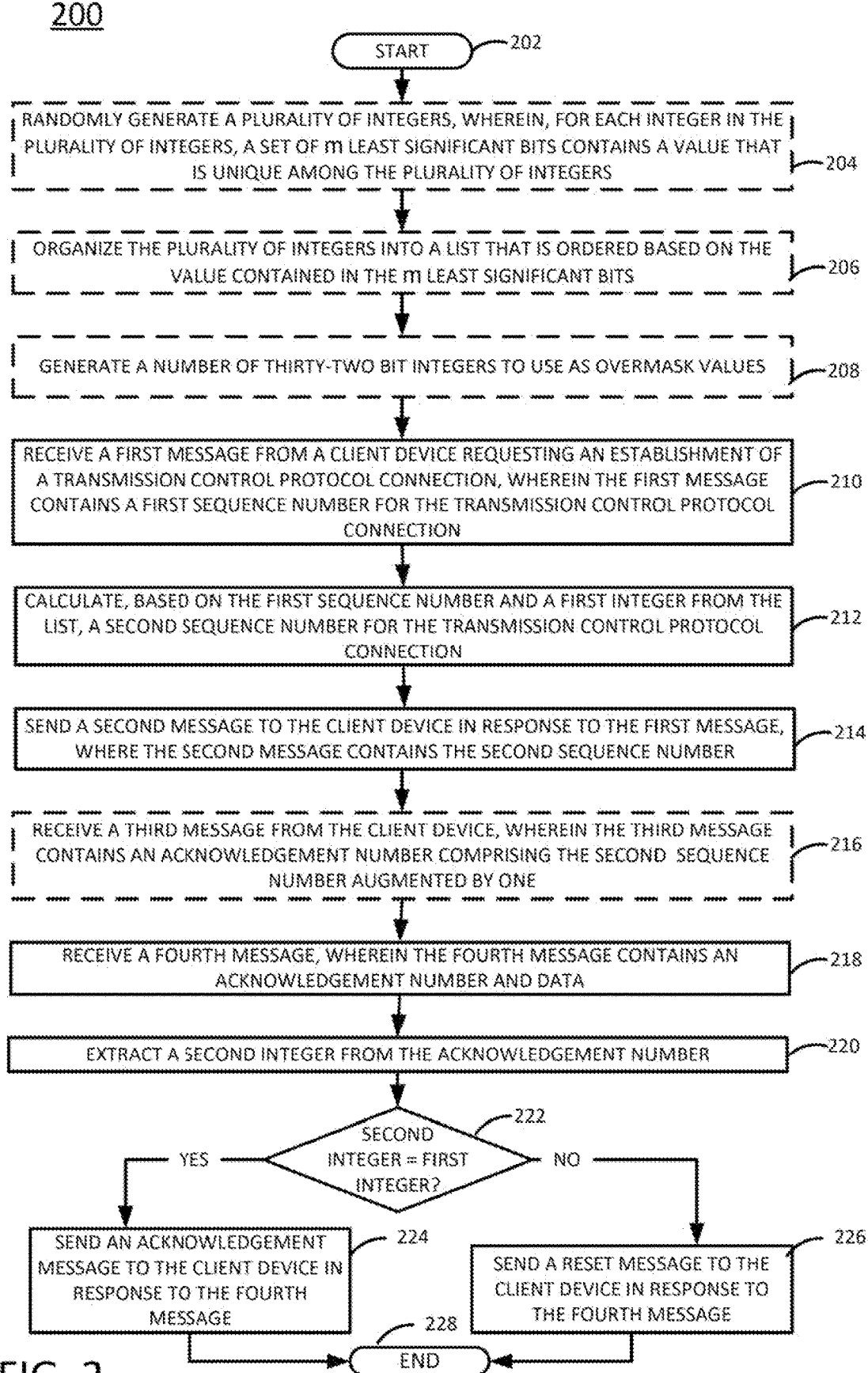
FIG. 2 illustrates a flowchart of an example method for providing stateless transmission control protocol connections that can be implemented in low-interaction honeypots.

To further aid in understanding the present disclosure, FIG. 2 illustrates a flowchart of an example method 200 for providing stateless transmission control protocol connections that can be implemented in low-interaction honeypots. In one example, the method 200 may be performed by one or more of the components of FIG. 1, such as the AS 104, servers 126, and/or sensors 116. However, in other examples, the method 200 may be performed by another device, such as the computing system 400 of FIG. 4, discussed in further detail below. For the sake of discussion, the method 200 is described below as being performed by a processing system (where the processing system may comprise a component of the AS 104, a server 126, a sensor 116, the computing system 400, or another device).

The method 200 begins in step 202. In optional step 204 (illustrated in phantom), the processing system may randomly generate a plurality of integers, wherein, for each integer in the plurality of integers, a set of m least significant bits contains a value that is unique among the plurality of integers.

In one example, where m=8, the plurality of integers comprises 256 randomly generated integers. In a further example, each integer in the plurality of integers may comprise a thirty-two-bit integer. The plurality of integers may then be distributed, overwriting the m least significant bits of each integer using values 0-255 (28). This results in the plurality of integers (e.g., 256 randomly generated, thirty-two bit integers), where each integer in the plurality of integers contains a unique value for its lower eight bits.

In optional step 206 (illustrated in phantom), the processing system may organize the plurality of integers into a list that is ordered based on the value contained in the lower eight bits.

In one example, the list orders the plurality of integers in ascending order according to the values in the m least significant bits of each integer. In another example, the list orders the plurality of integers in descending order according to the values in the m least significant bits of each integer.

In optional step 208 (illustrated in phantom), the processing system may be configured with a number k (where the value of k falls in the range of 2-10, in one example) of thirty-two bit integers to use as overmask values (e.g., overmask(0) through overmask(k−1)).

It should be noted that although FIG. 2 depicts steps 204-208 as optional steps, the ordered list of the plurality of integers and the list of overmask integers are required for later steps of the method 200. However, the lists of random integers may have been generated and ordered at some time prior to the method 200 beginning (e.g., during a previous execution of the method 200 by the processing system) or may have been performed by a device other than the processing system (e.g., by one or more other processing systems).

In step 210, the processing system may receive a first message from a client device requesting an establishment of a transmission control protocol (TCP) connection, wherein the first message contains a first (e.g., client-side) sequence number for the transmission control protocol connection.

In one example, the first message is a TCP SYN (i.e., synchronize sequence number) message. The first sequence number is a number that the client device will begin its messages with, when exchanging messages with the processing system over the TCP connection. FIG. 3, for instance, is an example sequence diagram illustrating a TCP "handshake" 300 through which a TCP connection may be established between an example client device (e.g., UE 108 of FIG. 1) and an example server (e.g., AS 104 of FIG. 1). The first (e.g., SYN) message is illustrated at 302. The first sequence number contained in the first message is illustrated as p.

In step 212, the processing system may calculate, based on the first sequence number, the first integer from the unordered list of the plurality of randomly generated integers, and the most recent overmask integer, overmask(0), a second (e.g., server-side) sequence number for the transmission control protocol connection.

In one example, the second sequence number is a number that the processing system will begin its messages with, when exchanging messages with the client device over the TCP connection. The second sequence number is illustrated as n in FIG. 3. In one example, n may be calculated as:

$$n = [IP\ address \wedge source\ port \wedge (destination\ port << 16)] \wedge r \wedge o \quad \text{(EQN. 1)}$$

where ^ is the bitwise exclusive OR operator, IP address is the IP address of the client device as an integer, source port is the source port of the client device from which the first message originated, (destination port<<16) is the destination port of the processing system at which the first message was received, bit shifted sixteen bits to the left, r is the first (e.g., first unused) integer from the ordered list of randomly generated integers, and o is the current overmask integer, overmask(0).

Figure 3:
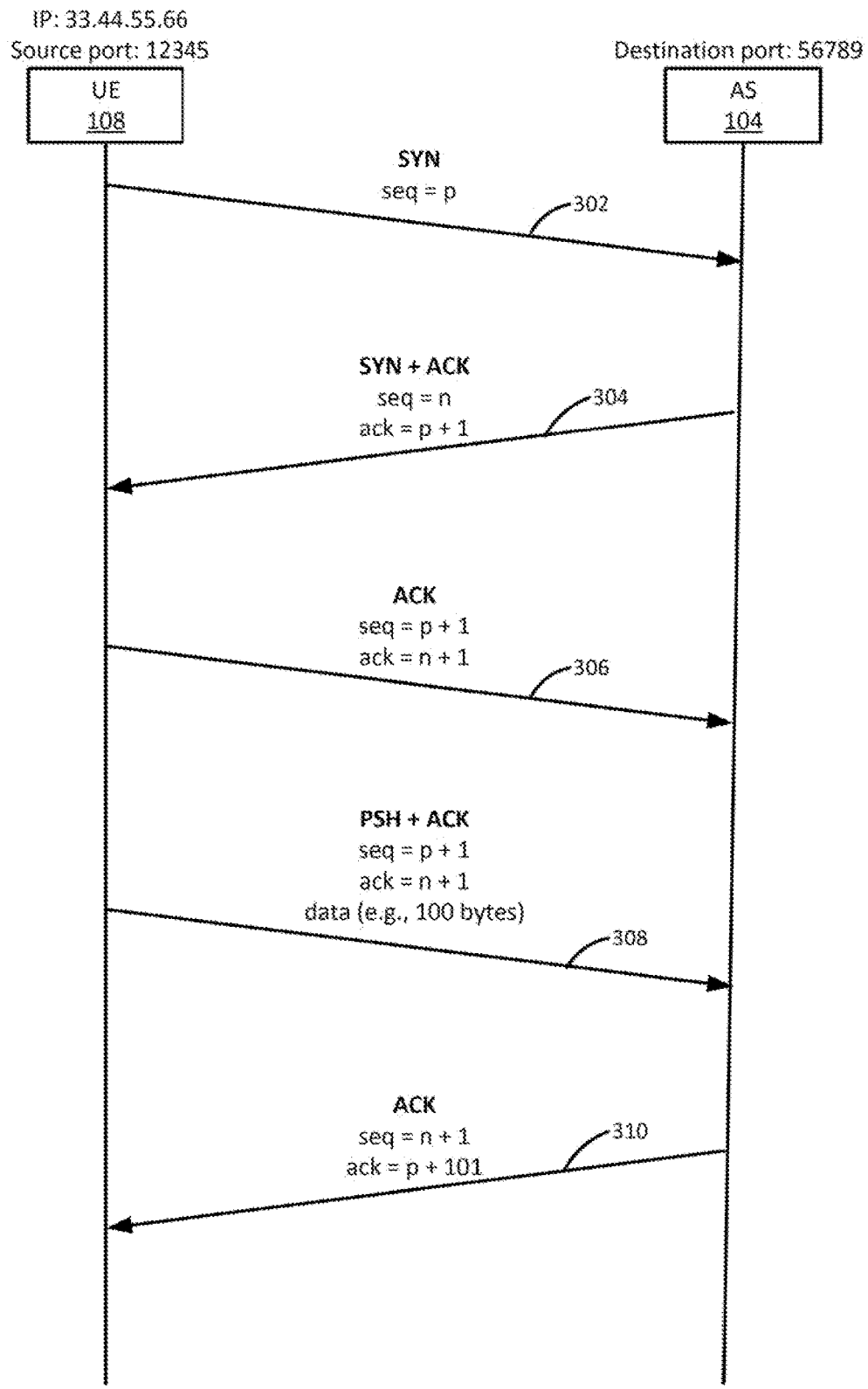
FIG. 3 is an example sequence diagram illustrating a transmission control protocol "handshake" through which a transmission control protocol connection may be established between an example client device and an example server.

In the example illustrated in FIG. 3, the IP address of the client device is 33.44.55.66 (which would be 556545858 if expressed as an integer), the source port of the client device from which the first (e.g., SYN) message originated is 12345, and the destination port of the processing system at which the first (e.g., SYN) message was received is 56789. Thus, using these example values and assuming that the first unused integer from the ordered list is 1234567890 and the value of the current overmask integer is 2345678901, the value of n in FIG. 3 may be calculated as n=[556545858 ^12345 ^ (56789<<16)]^1234567890 ^2345678901= [556545858 ^12345 ^3721723904]^ 1234567890 ^2345678901=4244178811 ^1234567890 ^2345678901=3043952041 ^2345678901=1052720540.

In step 214, the processing system may send a second message to the client device in response to the first message, wherein the second message contains the second sequence number (e.g., n).

In one example, the second message is a TCP SYN+ACK (i.e., synchronize sequence number+acknowledgement) message. The second (e.g., SYN+ACK) message is illustrated at 304 in FIG. 3. In one example, the ACK portion of the second message may contain an acknowledgement number (ack), i.e., the first sequence number augmented by one (p+1), while the SYN portion of the second message may contain the second sequence number (n).

In optional step 216 (illustrated in phantom), the processing system may receive a third message from the client device, wherein the third message contains an acknowledgement number (ack) comprising the second sequence number augmented by one (n+1).

In one example, the third message is a TCP ACK message. The third (e.g., ACK) message is illustrated at 306 in FIG. 3. The third message may be considered the final part of the TCP handshake between the processing system and the client device, and establishes the TCP connection between the processing system and the client device. Once the TCP connection is established, the processing system and the client device may begin transferring data to each other over the TCP connection.

In step 218, the processing system may receive a fourth message containing an acknowledgement number and data.

In one example, the fourth message is a TCP PSH (push)+ACK message. The fourth (e.g., PSH+ACK) message is illustrated at 308 in FIG. 3. In one example, the ACK portion of the fourth message may contain the first sequence number augmented by one and an acknowledgement number (which may comprise the second sequence number augmented by one). The PSH portion of the fourth message may contain the data (e.g., bytes to be pushed to the application layer, illustrated as 100 bytes in the example of FIG. 3).

In step 220, the processing system may extract a second integer from the acknowledgement number.

The second integer, x, may be calculated as:

$$x = (ack-1) \wedge [IP\ address^* \wedge source\ port^* \wedge (destination\ port^* << 16)] \quad \text{(EQN. 2)}$$

where ^ is the bitwise exclusive OR operator, ack is the acknowledgement number, IP address* is the IP address of the device from which the fourth message was received as an integer, source port* is the source port of the device from which the fourth message originated, (destination port*<<16) is the destination port of the processing system at which the fourth message was received, and bit shifted sixteen bits to the left.

In the example illustrated in FIG. 3, the acknowledgement number (ack=n+1) is 1052720541, the IP address of the device from which the fourth message is received is 33.44.55.66 (which would be 556545858 if expressed as an integer), the source port of the device from which the fourth (e.g., PSH+ACK) message originated is 12345, and the destination port of the processing system at which the fourth (e.g., PSH+ACK) message was received is 56789. Thus, using these example values, the value of x in FIG. 3 may be calculated as x=[(1052720541−1)^[556545858 ^12345 ^(56789<<16)]=(1052720541) [556545858 ^12345 ^(3721723904)]=1052720541 ^ 4244178811=3259382503.

In step 222, the processing system may determine whether the second integer is equal to the first integer. In one example, this determination may be made by cycling through the k overmask values, overmask(0) through overmask(k−1), to calculate the value of x ^overmask(z), where z has a value between zero and k−1. In the example illustrated, overmask(0)=2345678901, and 3259382503 ^2345678901=1234567890.

It can be seen from EQN. 1 and EQN. 2 that if the acknowledgement number is equal to the second sequence number augmented by one (e.g., ack=n+1), the IP address of the device from which the fourth message was received is the same as the IP address of the client device from which the first (and, optionally, third) message was received, the source port of the device from which the fourth message originated is the same as the source port of the client device from which the first message originated, and the destination port of the processing system at which the fourth message was received is the same as the destination port of the processing system at which the first message was received, then the second integer x will match the first integer r used in EQN. 1. This implies that the device from which the fourth message was received is the same as the client device from which the first message was received.

If, however, the second integer x does not match the first integer r, then this may imply that the device from which the fourth message was received is not the same as the client device from which the first message was received (e.g., even if the IP addresses and port numbers match).

In one example, the processing system may use the lower m bits of the second integer x to look up the second integer x in the ordered list of randomly generated integers. In one example, a value y may be set such that y=x & ($2^m-1$) (in the example illustrated in FIG. 3, y=210).

If the processing system concludes in step 222 that the second integer does match the first integer, then the processing system may proceed to step 224.

In step 224, the processing system may send an acknowledgement message (e.g., a fifth message) to the client device in response to the fourth message.

In one example, the acknowledgement message sent in step 224 may be an ACK message (to maintain the TCP connection) or a FIN+ACK message (to terminate the TCP connection), depending on the nature of the fourth message.

If, however, the processing system concludes in step 222 that the second integer does not match the first integer, then the processing system may proceed to step 226.

In step 226, the processing system may send a reset message (e.g., a fifth message) to the client device.

In one example, the reset message (e.g., RST) may terminate the TCP connection between the processing system and the client device and instruct the client device to initiate a new TCP connection to the processing system.

Once the processing system has responded to the fourth message with either an acknowledgement message or a reset message, the method 200 may end in step 228.

In one example, once all of the $2^m$ random integers have been used, the existing values may be rotated (e.g., overmask(k−2)→overmask(k−1), . . . , overmask(1)→overmask(2), overmask(0)→overmask(1)), and a new random thirty-two bit overmask(0) value may be generated. The $2^m$ random values may then be reused.

Although not expressly specified above, one or more steps of the method 200 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Moreover, it should be noted that when the terms "first," "second," "third," or the like are used herein to refer to items (such as a "message," an "integer," or the like), these terms are meant only to differentiate between two or more different items of the same type. In other words, such terms are not meant to imply that a particular number of items exists or is required for operation of the present disclosure. Nor is a reference to a "second," "third," or the like item meant to imply that a "first," "second," or the like item exists or is required.

FIG. 4 depicts a high-level block diagram of a computing device specifically programmed to perform the functions described herein. For example, any one or more components or devices illustrated in FIG. 1 or described in connection with the method 200 may be implemented as the system 400. For instance, the AS 104 or any of the servers 126 of FIG. 1 (such as might be used to perform the method 200) could be implemented as illustrated in FIG. 4.

As depicted in FIG. 4, the system 400 comprises a hardware processor element 402, a memory 404, a module 405 for providing stateless transmission control protocol connections that can be implemented in low-interaction honeypots, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing stateless transmission control protocol connections that can be implemented in low-interaction honeypots may include circuitry and/or logic for performing special purpose functions relating to estimating available bandwidth ranges and/or modifying settings for data transfers according to available bandwidth ranges. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing stateless transmission control protocol connections that can be implemented in low-interaction honeypots (e.g., a software program comprising computer-executable instructions) can be loaded into memory 404 and executed by hardware processor element 402 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing stateless transmission control protocol connections that can be implemented in low-interaction honeypots (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   receiving, by a processing system including at least one processor, a first transmission control protocol message from a client device requesting an establishment of a transmission control protocol connection, wherein the first transmission control protocol message contains a first sequence number for the transmission control protocol connection;
   calculating, by the processing system based on the first sequence number and a first integer from a list of a plurality of randomly generated integers, a second sequence number for the transmission control protocol connection, wherein the plurality of randomly generated integers comprises:
   $2^m$ thirty-two-bit integers, and a value of m represents a mask width selected by the processing system; and
   k thirty-two bit overmask values comprising values of overmask(0) through overmask (k−1);
   sending, by the processing system, a second transmission control protocol message to the client device in response to the first transmission control protocol message, wherein the second transmission control protocol message contains the second sequence number;
   receiving, by the processing system, a fourth transmission control protocol message containing an acknowledgement number and data;
   extracting, by the processing system, a second integer from the acknowledgement number;
   determining, by the processing system, whether the fourth transmission control protocol message originated with the client device by comparing the second integer to the first integer; and
   sending, by the processing system, a fifth transmission control protocol message to the client device, wherein a type of the transmission control protocol fifth message is selected based on an outcome of the determining.

2. The method of claim 1, wherein the plurality of randomly generated integers is sorted in the list by order according to a value of a set of m least significant bits of each integer of the plurality of randomly generated integers, and wherein the value of the m least significant bits of each integer is unique among the plurality of randomly generated integers.

3. The method of claim 2, wherein the order is an ascending order.

4. The method of claim 2, wherein the order is a descending order.

5. The method of claim 2, wherein the first integer is a first unused integer of the plurality of randomly generated integers that is sorted by order.

6. The method of claim 5, wherein the calculating comprises:
   executing a first bitwise exclusive OR operation on an integer representation of an internet protocol address of the client device, a source port of the client device from which the first message originated, and a value representing a destination port of the processing system at which the first transmission control protocol message was received, bit shifted sixteen bits left; and
   executing a second bitwise exclusive OR operation on a result of the first bitwise exclusive OR operation, the first integer, and a first overmask value.

7. The method of claim 6, wherein the extracting comprises:
   executing a third bitwise exclusive OR operation on a value equal to the acknowledgement number minus one, an integer representation of an internet protocol address of a device from which the fourth transmission control protocol message was received, a source port of the device from which the fourth transmission control protocol message originated, and a value representing a destination port of the processing system at which the fourth transmission control protocol message was received, bit shifted sixteen bits left.

8. The method of claim 7, wherein the comparing comprises using a set of m least significant bits of a result of the third bitwise exclusive OR operation to look up the second integer in the plurality of randomly generated integers.

9. The method of claim 2, further comprising:
   generating the plurality of randomly generated integers; and
   sorting the plurality of randomly generated integers by order according to a value of a set of m least significant bits of each integer of the plurality of randomly generated integers.

10. The method of claim 1, further comprising:
establishing the transmission control protocol connection after sending the second transmission control protocol message, but prior to receiving the fourth transmission control protocol message.

11. The method of claim 10, wherein the fifth transmission control protocol message comprises an acknowledgement message when the comparing determines that the second integer matches the first integer.

12. The method of claim 11, wherein the acknowledgement message includes an indication that the transmission control protocol connection should be terminated.

13. The method of claim 10, wherein the fifth transmission control protocol message comprises a reset message when the comparing determines that the second integer does not match the first integer.

14. The method of claim 1, wherein the processing system is configured as part of a sensor in an internet protocol network.

15. The method of claim 14, wherein the sensor listens to traffic on all ports associated with an internet protocol address simultaneously.

16. The method of claim 15, wherein the sensor responds to inbound traffic on the all ports at full line speed.

17. The method of claim 14, wherein the sensor comprises a honeypot.

18. A non-transitory computer-readable medium storing instructions which, when executed by a processing system including at least one processor, cause the processing system to perform operations, the operations comprising:
receiving a first transmission control protocol message from a client device requesting an establishment of a transmission control protocol connection, wherein the first transmission control protocol message contains a first sequence number for the transmission control protocol connection;
calculating, based on the first sequence number and a first integer from a list of a plurality of randomly generated integers, a second sequence number for the transmission control protocol connection, wherein the plurality of randomly generated integers comprises:
$2^m$ thirty-two-bit integers, and a value of m represents a mask width selected by the processing system; and
k thirty-two bit overmask values comprising values of overmask(0) through overmask(k−1);
sending a second transmission control protocol message to the client device in response to the first transmission control protocol message, wherein the second transmission control protocol message contains the second sequence number;
receiving a fourth transmission control protocol message containing an acknowledgement number and data;
extracting a second integer from the acknowledgement number;
determining whether the fourth transmission control protocol message originated with the client device by comparing the second integer to the first integer; and
sending a fifth transmission control protocol message to the client device, wherein a type of the fifth transmission control protocol message is selected based on an outcome of the determining.

19. The non-transitory computer-readable medium of claim 18, wherein the plurality of randomly generated integers is sorted in the list by order according to a value of a set of m least significant bits of each integer of the plurality of randomly generated integers, and wherein the value of the m least significant bits of each integer is unique among the plurality of randomly generated integers.

20. A system comprising:
a processing system including at least one processor; and
a non-transitory computer-readable medium storing instructions which, when executed by the processing system, cause the processing system to perform operations, the operations comprising:
receiving a first transmission control protocol message from a client device requesting an establishment of a transmission control protocol connection, wherein the first transmission control protocol message contains a first sequence number for the transmission control protocol connection;
calculating, based on the first sequence number and a first integer from a list of a plurality of randomly generated integers, a second sequence number for the transmission control protocol connection, wherein the plurality of randomly generated integers comprises:
$2^m$ thirty-two-bit integers, and a value of m represents a mask width selected by the processing system; and
k thirty-two bit overmask values comprising values of overmask(0) through overmask(k−1);
sending a second transmission control protocol message to the client device in response to the first transmission control protocol message, wherein the second transmission control protocol message contains the second sequence number;
receiving a fourth transmission control protocol message containing an acknowledgement number and data;
extracting a second integer from the acknowledgement number;
determining whether the fourth transmission control protocol message originated with the client device by comparing the second integer to the first integer; and
sending a fifth transmission control protocol message to the client device, wherein a type of the fifth transmission control protocol message is selected based on an outcome of the determining.

\* \* \* \* \*